United States Patent [19]
Wang

[11] Patent Number: 6,151,594
[45] Date of Patent: Nov. 21, 2000

[54] ARTIFICIAL NEURON AND METHOD OF USING SAME

[75] Inventor: Shay-Ping Thomas Wang, Tempe, Ariz.

[73] Assignee: Motorola, Inc., Schaumburg, Ill.

[21] Appl. No.: 08/294,235

[22] Filed: Aug. 22, 1994

Related U.S. Application Data

[63] Continuation of application No. 08/076,602, Jun. 14, 1993, Pat. No. 5,390,136.

[51] Int. Cl.$^7$ .................................................... G06F 15/18
[52] U.S. Cl. ............................................. 706/43; 706/41
[58] Field of Search ..................... 395/27, 21; 706/43, 706/41

[56] References Cited

U.S. PATENT DOCUMENTS

| | | | |
|---|---|---|---|
| 3,922,536 | 11/1975 | Hampel et al. | 708/446 |
| 3,967,100 | 6/1976 | Shimomura | 708/446 |
| 4,156,922 | 5/1979 | Majerski et al. | 708/625 |
| 4,912,649 | 3/1990 | Wood | 706/25 |
| 4,949,292 | 8/1990 | Hoshino et al. | 708/520 |
| 5,042,001 | 8/1991 | Brightman et al. | 708/490 |
| 5,073,867 | 12/1991 | Murphy et al. | 706/42 |
| 5,170,071 | 12/1992 | Shreve | 706/43 |
| 5,179,631 | 1/1993 | Guddanti et al. | 706/41 |
| 5,191,637 | 3/1993 | Furuta et al. | 706/42 |
| 5,220,559 | 6/1993 | Tsuzuki et al. | 700/4 |
| 5,239,594 | 8/1993 | Yoda | 382/158 |
| 5,271,090 | 12/1993 | Boser | 706/26 |
| 5,278,945 | 1/1994 | Basehore et al. | 706/41 |
| 5,323,470 | 6/1994 | Kara et al. | 382/103 |
| 5,355,436 | 10/1994 | Shin et al. | 706/26 |
| 5,386,497 | 1/1995 | Torrey | 706/35 |
| 5,394,511 | 2/1995 | Mashiko | 706/33 |
| 5,408,588 | 4/1995 | Ulug | 706/25 |
| 5,412,565 | 5/1995 | Boser et al. | 708/7 |

FOREIGN PATENT DOCUMENTS

WO 87/07053  11/1987  WIPO .

OTHER PUBLICATIONS

Hata et al, "Gate Model Networks for Minimization of Multiple–Valued Logic Functions", Proceedings of the Twenty–Third Inter–Symposium on Multiple–Valued Logic, IEEE, May 24–27, 1993.

Polynomial and Standard Higher Order Neural Network, Chir–Ho Chang, Jin–Ling Lin, and J.Y. Cheung, Electrical Engineering and Computer Science, University of Oklahoma, 1993 IEEE International Conference on Neural Networks, Mar. 28–April 1, 1993, pp. 989–994.

A Neural Feed–Forward Network with a Polynomial Nonlinearity, Nils Hoffmann, Electronics Institute, Building 349, Technical University of Denmark, DK–2800 Lyngby, Denmark, Neural Networks for Signal Processing, Proceedings of the IEEE–SP Workshop, Aug. 31–Sep.2, 1992, pp. 49–58.

(List continued on next page.)

*Primary Examiner*—Tariq R. Hafiz
*Assistant Examiner*—George Davis
*Attorney, Agent, or Firm*—James E. Gauger

[57] ABSTRACT

An artificial neuron, which may be implemented either in hardware or software, has only one significant processing element in the form of a multiplier. Inputs are first fed through gating functions to produce gated inputs. These gated inputs are then multiplied together to produce a product which is multiplied by a weight to produce the neuron output.

8 Claims, 4 Drawing Sheets

OTHER PUBLICATIONS

Modeling systems with Polynomial Networks, Tools for Predicting Behavior, Peter D. Varhol, Programmer's Workbench, Dr. Dobb's Journal, Sep. 1993, Begins on p. 76.

AIM Outperforms Neural Networks and Regression, Mark Shewhart, USAF (IEEE Spectrum), AbTech Corporation, Charlotteville, VA 22903.

Polynomial Functions Can Be Realized by Finite Size Multilayer Feedforward Neural Networks, Naohiro Toda, Ken–ichi Funahashi and Shiro Usui Department of Information and Computer Sciences, Toyohashi University of Technology, Tempaku, Toyohashi 441, Japan, 1991 IEEE International Joint Conference on Neural Networks, vol. 1of3, The Westin Stamford and Westin Plaza, Nov. 18–21, 1991, Singapore.

An Artificial Neural Networks for Approximating Polynomial Functions, Behnam Malakooti and YingQing Zhou, Department of Systems Engineering, Center for Automation and Intelligent Systems Research, Case Western Reserve University, Cleveland, Ohio, International Joint Conference on Neural Networks, Jun. 1992, pp. III–966–III–971.

Recursive Reduction in Finite Ring Computations, D. Zhang, G.A. Jullien, W.C. Miller, VLSI Research Group, Department of Electrical Engineering, University of Windsor, Windsor, Ontario Cananda N9B 3P4, Twenty–Third Asilomar conf. on Signals, systems and Computers, Conference Record vol. 2of2, pp. 854–857.

Robot Kinematics Learning Computations Using Polynomial Neural Networks, C.L. Philip Chen and A.D. McAulay, Department of Computer Science and Engineering, Wright State University, Dayton, OH 45435, Proceedings of the 1991 IEEE, International Cof. on Robotics and Automation, Sacramento, CA, Apr. 1991, pp. 2638–2643.

Backpropagation Based on the Logarithmic Error Function and Elimination of Local Minima, Kiyotoshi Matsuoka and Jianqiang Yi, Department of Control Engineering, Kyushu Institute of Technology, Sensul 1–1. Tobata. Kitakyushu, 804 Japan, CH3065–0/91/0000–1117 IEEE, pp. 1117–1122.

Highly–automated, Non–parametric statistical learning for autonomous target recognition, Keith C. Drake, AbTech Corporation, 700 Harris Street, Charlottesville, Virginia 22903, pp. 1–10, Proceedings of the SPI 20th Applied Imagery Pattern Recognition Workshop, Oct. 1991, McLean, Virginia.

Generalization and Learning in Volterra and Radial Basis Function Networks: A Theoretical Analysis, Sean B. Holden and Peter J.W. Rayner, Cambridge University Engineering Department,Trumpington Street, Cambridge CB2 1PZ, U.K., 0–7803–0532–9/92, 1992 IEEE, pp. II–273–II–276.

On the Design Principles of the Functional Link Nets, Jun Wang and Edilberto P. Teixeira, Department of Systems Engineering, Case Western Reserve University, Cleveland, Ohio 44106, pp. 613–616, Ieee Internation Conf. on Systems Engineering, Aug. 9–11, 1990, Vista International Hotel, Pittsburgh, Pennsylvania, IEEE Catalog No.:90CH2872–0.

A Digital Neuron–Type Processor and Its VLSI Design, Mahmoud K. Habib et al., IEEE Transactions on Circuits and Systems 36 (1989) May, No. 5, New York, pp. 739–746.

Training Product Unit Neural Networks with Genetic Algorithms, David J. Janson et al., IEEE Export, Oct. 1993, pp. 26–32.

Output Weight Optimization for the Multi–Layer Perception, M.T. Manry et al., Twenty–sixth Asilomar Conference on Signals, Systems and Computers, Oct. 1992, pp. 26–28.

A Polynomial Time Algorithm for Generating Neural Networks for Classification Problems, Asim Roy et al., IJCNN, 1992, pp. I–147–I–152.

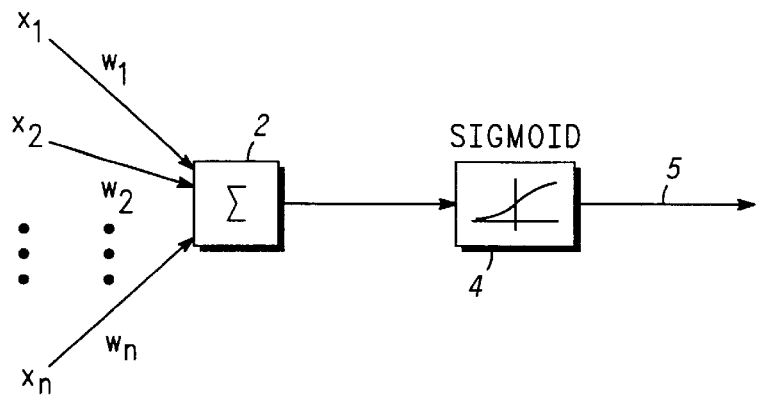
FIG. 1
—PRIOR ART—
FIG. 2
—PRIOR ART—
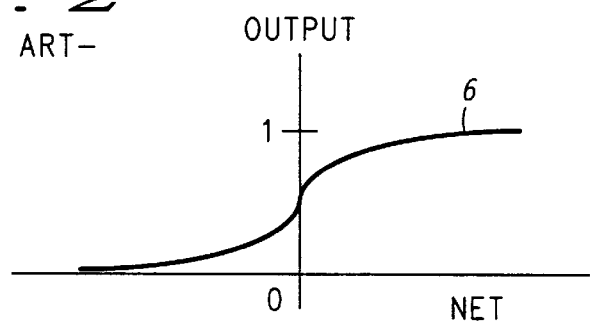
FIG. 3
—PRIOR ART—
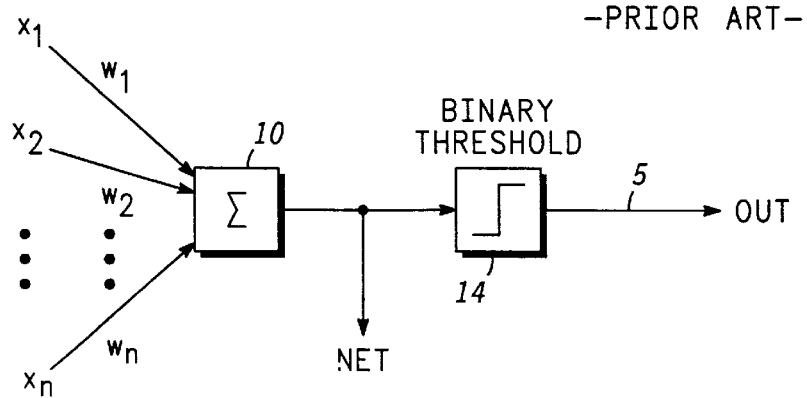

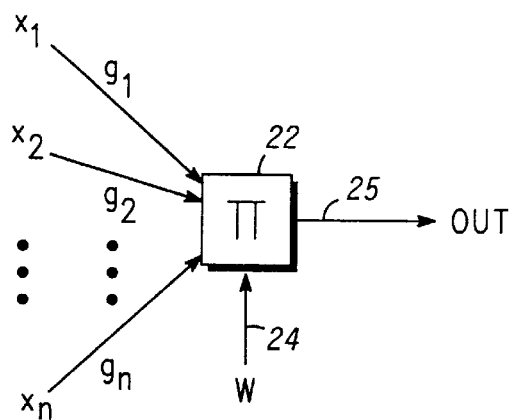
FIG. 4
FIG. 5
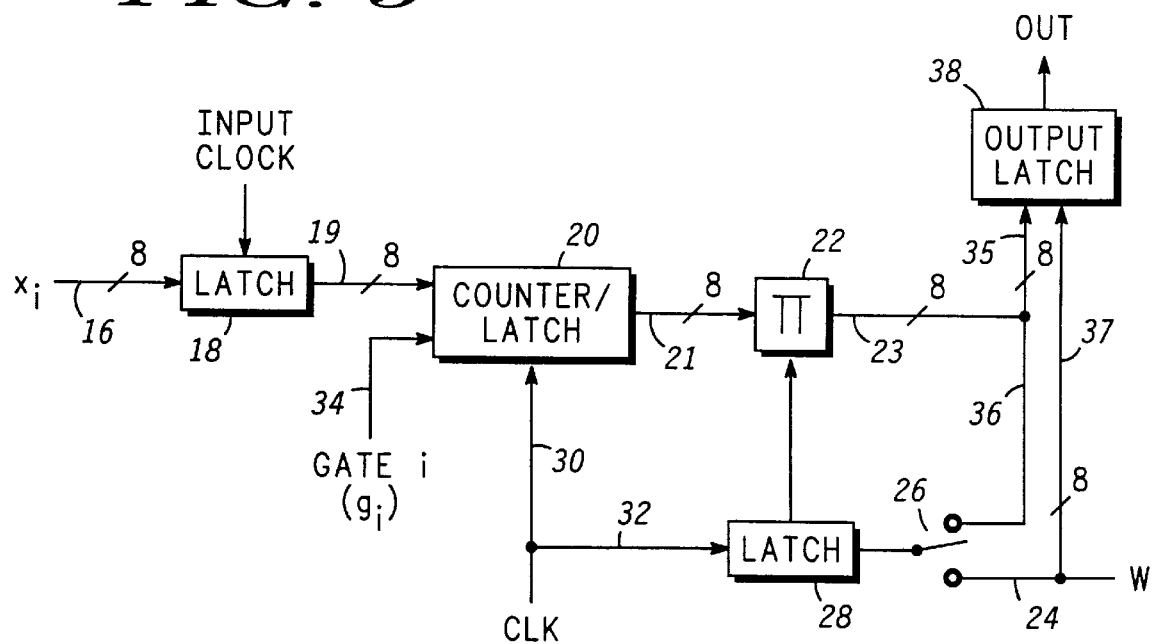

ARTIFICIAL NEURON AND METHOD OF USING SAME

This is a continuation U.S. division of application Ser. No. 08/076,602, filed on Jun. 14, 1993 U.S. Pat. No. 5,390,136.

RELATED INVENTION

The present invention is related to the following invention which is assigned to the same assignee as the present invention:

"Neural Network that does not Required Repetitive Training", having Ser. No. 08/076,601, U.S. Pat. No. 5,517,667.

The subject matter of the above-identified related invention is hereby incorporated by reference into the disclosure of this invention.

1. Technical Field

This invention relates generally to artificial neurons and, in particular, to an artificial neuron that can take the form of (1) a neuron circuit which can be employed as the building block of a neural network that can be implemented in a VLSI (very large scale integration) chip or of (2) a computer program, and which artificial neuron utilizes a training algorithm that does not require repetitive training and that yields a global minimum to each given set of input vectors.

2. Background of the Invention

Artificial neural networks have utility in a wide variety of computing environments, such as speech recognition, process control, optical character recognition, signal processing, and image processing. Processing engines for many of the foregoing computing environments may be implemented through neural networks comprising a plurality of elemental logic elements called neuron circuits.

A neuron circuit (or processing element) is the fundamental building block of a neural network. A neuron circuit has multiple inputs and one output. The structure of a conventional neuron circuit often includes a multiplier circuit, a summing circuit, a circuit for performing a non-linear function (such as a binary threshold or sigmoid function), and circuitry functioning as synapses or weighted input connections. Refer to FIG. 1, wherein inputs $x_1$–$x_n$ are weighted by respective synapses $w_1$–$w_n$ and accumulated together by summing circuit 2. The output of summing circuit 2 is fed into non-linear circuit 4 to generate the neuron circuit output 5.

FIG. 2 shows a non-linear transfer function in the form of a sigmoid-shaped function which is used by the prior art neuron circuit shown in FIG. 1. In the example shown, the sigmoid curve 6 is expressed by the equation:

$$\text{OUTPUT} = 1/(1+e^{-NET}) \qquad \text{EQUATION 1}$$

FIG. 3 shows another prior art neuron circuit, referred to as a perceptron neuron, which employs a binary threshold function. In this example, the perceptron neuron uses a binary threshold 14 as the non-linear function.

In summary, a typical conventional neuron circuit requires circuitry for weighted input connections, a summing circuit, a multiplier circuit, and complex circuitry for performing the non-linear function. Thus, the number of conventional neuron circuits which can be manufactured on a semiconductor chip is severely limited.

Therefore there is a significant need for a neuron circuit which has a minimum of components and which is simple and inexpensive to implement.

Conventional neural networks built of prior art neuron circuits require very lengthy training cycles, and even then they usually fail to converge on the correct result for every possible combination of input values. This is referred to in the art as achieving only a "local minimum" rather than a "global solution".

For example, the Feb. 18, 1993 issue of *Electronic Design*, p. 51, states that approximately 3 trillion ($3 \times 10^{12}$) training operations are required to train a typical neural network utilizing prior art neuron circuits. This typically requires weeks or even months of computational time, often using a super-computer.

Therefore, there is also a significant need for an artificial neuron that can form the basis of a neural network which does not require lengthy training cycles and which converges on a global solution in a single training cycle.

SUMMARY OF INVENTION

In one embodiment of the present invention there is provided an artificial neuron which requires only a multiplier as its main processing element. The artificial neuron may be implemented either in hardware or in software.

In another embodiment of the present invention there is provided a neuron circuit which requires only a multiplier circuit as its main processing element. Unlike conventional neuron circuits, a neuron circuit embodying the concepts of the present invention need not utilize any non-linear function or a summing circuit. Therefore, many more neuron circuits can be integrated in a VLSI chip, which greatly increases the computational power of a neural network using one or more of such chips.

Moreover, in contrast to conventional neural networks, a neural network constructed of a plurality of artificial neurons in accordance with the present invention, whether implemented in hardware or in software, as disclosed in the above-identified Related Invention, converges on a global solution in a single training cycle (also referred to as an epoch or iteration) which can often be computed in no more than a few minutes on a personal computer.

Thus it will be appreciated that a neural network comprising artificial neurons in accordance with the present invention performs with vastly more accurate results, at a vastly improved reduction in computational time, and with a vast reduction in the cost and complexity of its implementation, whether on a semiconductor chip or in a computer program.

Thus it is one advantage of the present invention to provide a neuron circuit which comprises a minimum of circuit elements so that a neural network may be built comprising a very large number of such neuron circuits, resulting in a product which is commercially competitive due to its high level of functionality and low cost of manufacture.

It is also an advantage of the present invention to provide an artificial neuron which comprises only a multiplier as its main processing element.

Yet another advantage of the present invention is to provide an artificial neuron which can be utilized as the building block of a neural network (disclosed in the above-identified Related Invention) which does not require repetitive training and which yields a global minimum to each given set of input vectors.

It is another advantage of the present invention to provide various methods of using an artificial neuron in accordance with the present invention.

According to one aspect of the invention, there is provided a neuron circuit comprising a multiplier circuit responsive to a plurality of gated inputs and generating an output, the multiplier circuit comprising: means for multiplying the gated inputs together to produce a product; and means for multiplying the product by a predetermined weight to generate the output.

According to another aspect of the invention, there is provided in a neuron having a plurality of inputs $x_i$, wherein i is a positive integer, a method of producing an output comprising (a) applying a gating function ($g_i$) to each of the inputs $x_i$ to produce a corresponding plurality of gated inputs; (b) multiplying the gated inputs together to produce a product; and (c) multiplying the product by a predetermined weight W.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a prior art neuron circuit.

FIG. 2 shows a non-linear transfer function in the form of a sigmoid-shaped function which is used by the prior art neuron circuit shown in FIG. 1.

FIG. 3 shows another prior art neuron circuit, referred to as a perceptron neuron, which employs a binary threshold function.

FIG. 4 shows a conceptual block diagram of an artificial neuron in accordance with a preferred embodiment of the invention.

FIG. 5 shows a logic circuit implementation of a neuron circuit in accordance with a preferred embodiment of the invention.

DETAILED DESCRIPTION OF A PREFERRED EMBODIMENT

Figure 6:
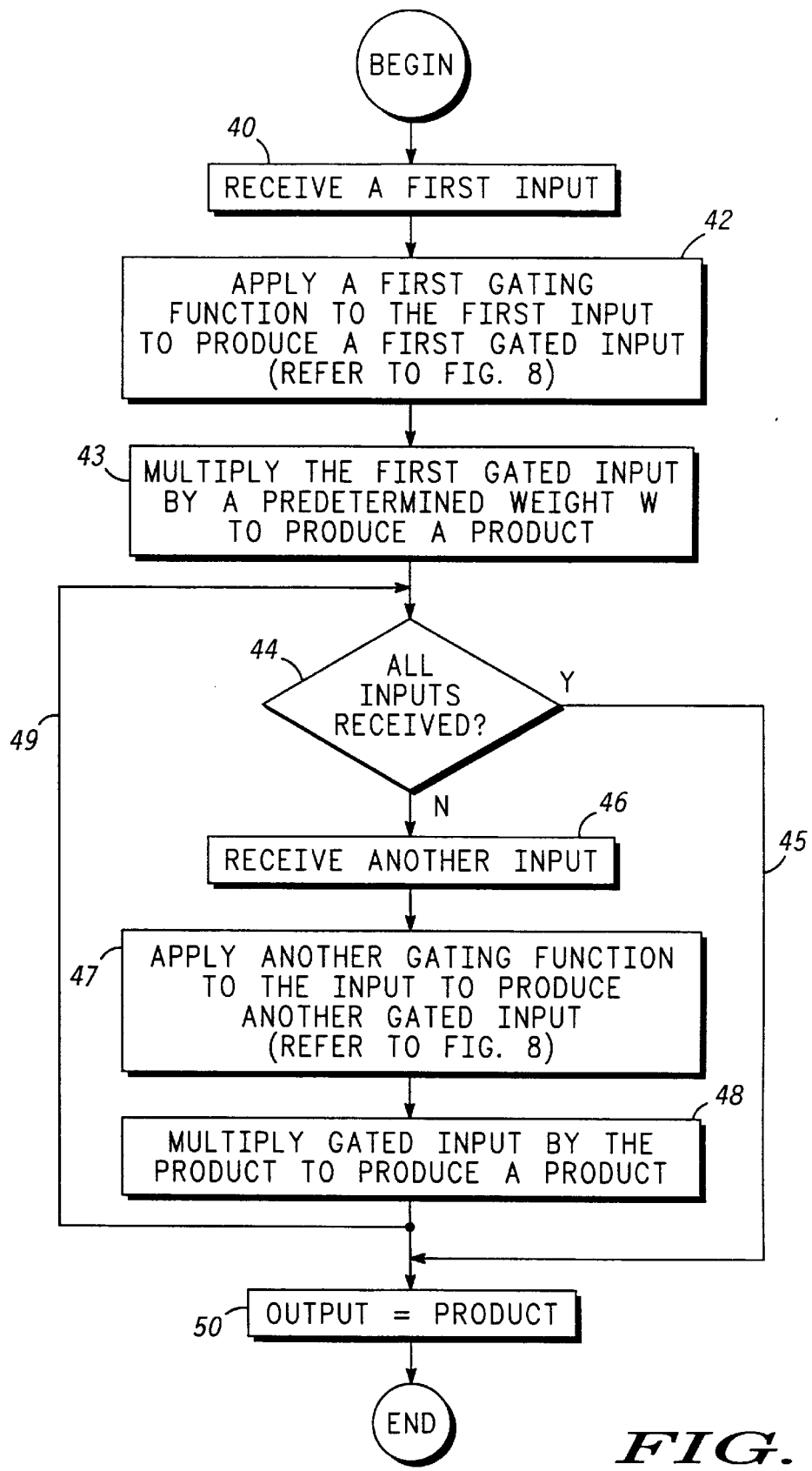
FIG. 6 shows a flow diagram of a method of using a neuron circuit in accordance with a preferred embodiment of the invention.

It will be understood by one of ordinary skill in the art that the artificial neuron of the present invention may be implemented in hardware, software, or a combination thereof, and that the terms "neuron circuit" and "neuron" are used interchangeably in this description, as are the terms "multiplier circuit" or "multiplier", and the terms "summing circuit" or "summer", depending upon the type of implementation.

In addition, since it will be apparent to one of ordinary skill that a multiplication operation may be performed by an inverse division operation, the term "multiplier circuit" is defined herein to include a divider circuit, and the term "multiplier" is defined herein to include a divider.

With reference now to FIG. 4, a conceptual block diagram of an artificial neuron in accordance with a preferred embodiment of the invention is shown. Inputs $x_1, x_2, \ldots, x_n$ are gated by respective gating functions $g_1, g_2, \ldots, g_n$ to produce gated inputs having exponential powers. For example, if $g_i=0$, then the gated input corresponding to input $x_i$ is $x_i^0$ or 1; if $g_i=1$, then the gated input corresponding to input $x_i$ is $x_i$; if $g_i=2$, then the gated input corresponding to input $x_i$ is $x_i^2$, and so forth.

The gated inputs $x_1^{g_1}, x_2^{g_2}, \ldots, x_n^{g_n}$ are multiplied together in multiplier 22, and their product is multiplied by a weight $w_i$ shown conceptually as weight W being input over line 24. The resulting product represents the output (OUT) from multiplier 22 over line 25.

As is explained in further detail in the above-identified Related Invention, the appropriate values of $g_i$ and $w_i$ are determined by the individual terms of a polynomial expansion or orthogonal function which is utilized as the basis of operation of a neural network incorporating a plurality of the herein-described artificial neurons.

It will be understood by one of ordinary skill in the art that the artificial neuron shown in FIG. 4 may be implemented in many different ways, one of which is shown in FIG. 5.

Referring now to FIG. 5, a logic circuit implementation of a neuron circuit in accordance with a preferred embodiment of the invention is shown. FIG. 5 is a digital implementation of the neuron circuit of the present invention which is conceptually shown in FIG. 4. In this embodiment, a plurality of inputs $x_i$ are sequentially applied to the neuron circuit.

The neuron circuit comprises five primary elements: counter/latch 20, multiplier 22, multiplexer (MUX) 26, latch 28, and output latch 38. An input latch 18 is also shown as part of this circuit implementation; however, in a neural network comprising a plurality of neuron circuits, as disclosed, for example, in the above-identified Related Invention, a single input latch 18 may be shared by a plurality of neuron circuits. Multiplier 22 represents the only significant processing element of the neuron circuit.

As mentioned earlier, it will be appreciated that other means, including a divider circuit, may be incorporated in the multiplier circuit to perform the multiplication/division function.

Input latch 18 receives inputs $x_i$ over, for example, an 8-bit data bus 16, although it will be understood by one of ordinary skill in the art that the width of the data bus may be 16 bits, floating-point, or any other desired value. Input latch 18 is controlled by an INPUT CLOCK.

The INPUT CLOCK is incremented when the count in counter/latch 20 reaches 0. It will be understood by one of ordinary skill that a neural network comprises many neuron circuits, each of which may comprise a counter/latch circuit, and that the INPUT CLOCK will not be incremented until the count in all of such counter/latches reaches 0.

The output of input latch 18 is fed to counter/latch 20 via an 8-bit data bus 19.

Counter/latch 20 and latch 28 are responsive to an internal clock signal (CLK). CLK increments at a constant rate. Counter/latch 20 and latch 28 receive CLK via lines 30 and 32, respectively.

Counter/latch 20 serves to hold the input data for a desired number of CLK cycles in order to produce the desired gating function. Counter/latch 20 is responsive to a gating input line 34 over which are provided exponential values $g_i$ for the corresponding input values $x_i$.

As explained above regarding FIG. 4, inputs $x_1, x_2, \ldots, x_n$ are gated by respective gating functions $g_1, g_2, \ldots, g_n$ to produce gated inputs having exponential powers. For example, if $g_i=2$, then the gated input corresponding to input $x_i$ is $x_i^2$.

The output of counter/latch 20 is provided to multiplier 22 via an 8-bit data bus 21. The output of multiplier 22 is coupled to the input of latch 28 via 8-bit data bus segments 23 and 36 and via multiplexer 26. Multiplexer 26 multiplexes the output values of multiplier 22, received over bus segment 36, and weight W, received over line 24, to the input of latch 28.

The output of multiplier 22 is also coupled to the input of output latch 38 via 8-bit data bus segment 35. Weight W is also coupled to an input of output latch 38 via an 8-bit bus segment 37. For certain calculations it will be understood that W can be sent to output latch 38 directly, bypassing the multiplier 22.

At the start of a computational cycle MUX 26 is switched to line 24 to receive weight W. After multiplier circuit 22 generates the first product, MIX 26 switches to couple line 36 to latch 28.

Latch 28 temporarily holds the output of multiplier 22 for multiplying by the output of counter/latch 20.

Counter/latch 20 functions as a count-down circuit, in that it is initially loaded with the value of $g_i$ and counts down to $g_i=0$. As will be explained in greater detail below, for each internal clock cycle the value of $g_i$ which has been applied to counter/latch 20 over line 34, and is being stored therein, is reduced by one, and so long as $g_i$ is not equal to 0, the input value $x_i$ is continued to be multiplied by the product of the previous multiplication cycle, which is applied over bus segments 23 and 36, through MUX 26, to latch 28. When $g_i=0$, multiplier 22 stops multiplying, and the output of multiplier 22, appearing at the output latch 38, represents the output (OUT) of the neuron circuit.

FIG. 6 shows a flow diagram of a method of using a neuron circuit in accordance with a preferred embodiment of the invention. The method whose steps are illustrated in FIG. 6 relates to the neuron circuit shown in FIG. 5.

As illustrated in box 40, a first input is received by the neuron circuit, e.g. by latch 18 (FIG. 5).

Next, as illustrated in box 42, a first gating function is applied to the first input to produce a first gated input. The gating function is shown in greater detail in FIG. 8, discussed below.

Next, as illustrated in box 43, the first gated input is multiplied by a predetermined weight W to produce a product.

Next, regarding decision box 44, a check is made to determine whether all inputs have yet been received. If so, the procedure is finished with the current batch of inputs, and it exits via line 45. If not, the procedure proceeds to box 46.

As illustrated in box 46, another input is received by the neuron circuit.

Next, regarding box 47, another gating function is applied to this input to produce another gated input.

Then, in box 48, the gated input produced in box 47 is multiplied by the product produced in box 43 (or previously produced in box 48, if this is not the first time through box 48) to produce a product.

The procedure then returns to decision box 44 via line 49.

After the procedure has dealt with all inputs, and it exits decision box 44 via line 45 into box 50, where the final product represents the output of the neuron circuit.

Figure 7:
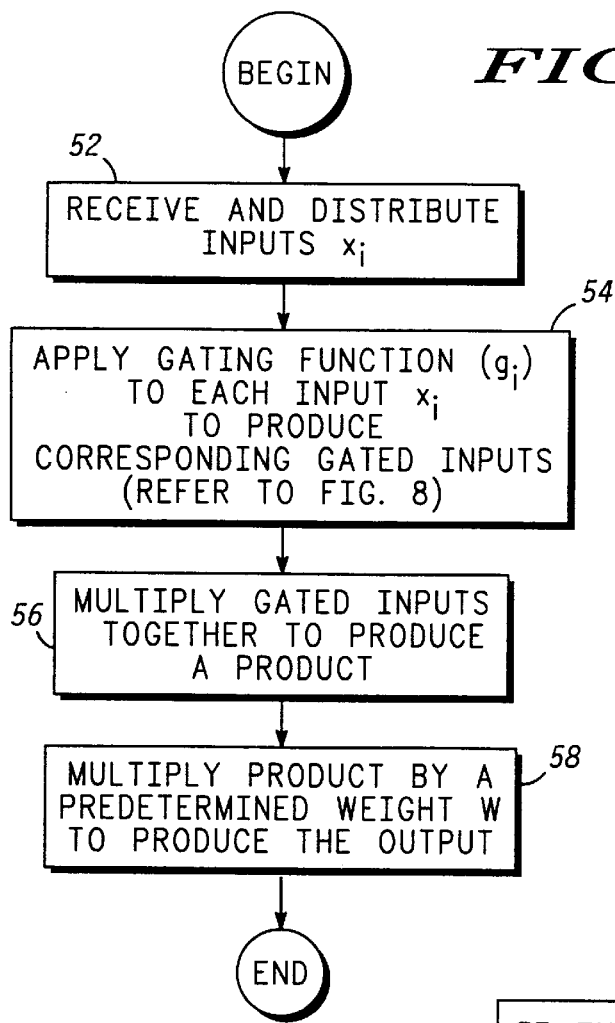
FIG. 7 shows a flow diagram of an alternative method of using an artificial neuron in accordance with the present invention.

FIG. 7 shows a flow diagram of an alternative method of using an artificial neuron in accordance with the present invention. The method whose steps are illustrated in FIG. 7 relates to the artificial neuron shown in FIG. 4.

As illustrated in box 52, a plurality of inputs $x_i$ are received by the artificial neuron and distributed to the multiplier circuit.

As illustrated in box 54, as the plurality of inputs $x_i$ are distributed to the multiplier, a gating function is applied to each of them to produce a corresponding plurality of gated inputs. The gating function is shown in greater detail in FIG. 8, discussed below.

As illustrated in box 56, the gated inputs are multiplied together to produce a product. Then, as illustrated in box 58, the product is multiplied by a predetermined weight W to produce a product representing the output of the artificial neuron.

Figure 8:
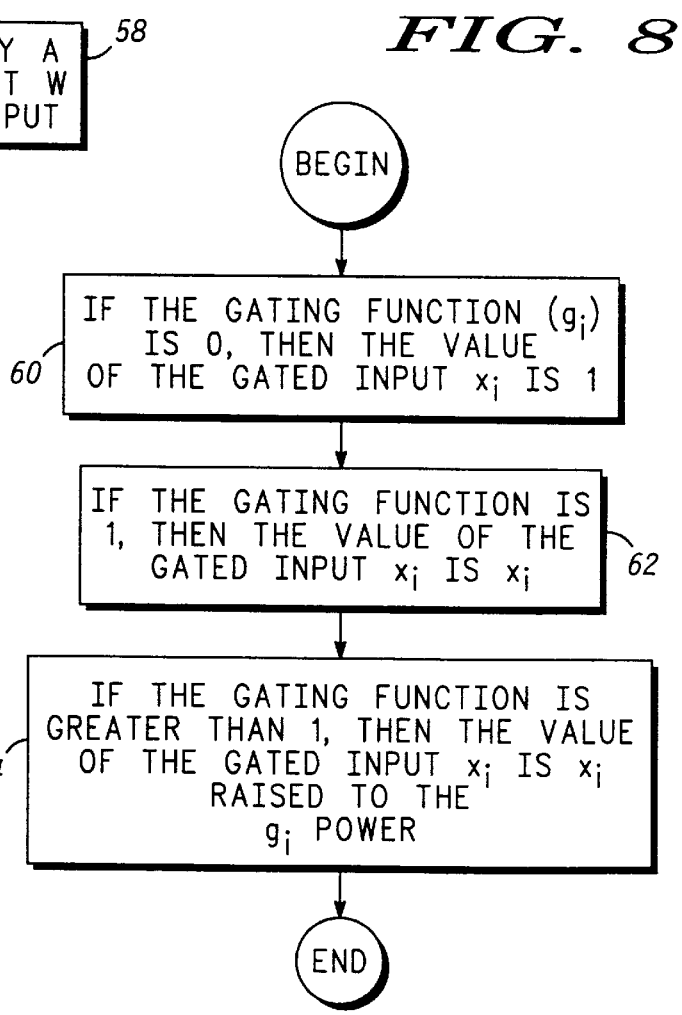
FIG. 8 shows a flow diagram of a gating function which may form part of the methods of using an artificial neuron illustrated in FIGS. 6 and 7.

FIG. 8 shows a flow diagram of a gating function which may form part of the methods of using an artificial neuron illustrated in FIGS. 6 and 7.

With reference to FIGS. 4 and 8, the gating function applicable to the inputs $x_i$ of the neuron circuit may be expressed by the following: (a) if the gating function $g_i$ is 0, pass 1 to the multiplier circuit 22 (refer to box 60 of FIG. 8); (b) if the gating function $g_i$ is 1, pass the input $x_i$ to the multiplier circuit 22 (refer to box 62 ); and if the gating function is greater than 1, pass the input $x_i$ raised to the $g_i$ power to the multiplier circuit 22 (refer to box 64 ).

The neuron circuit of the embodiment shown in FIG. 4 thus generates an output of the form $W\ x_1^{g_1}\ x_2^{g_2} \ldots x_n^{g_n}$.

Operation of a Preferred Embodiment

With reference now to FIG. 5, the operation of a preferred embodiment of the invention will be described. In the example given below, the object is to generate a neuron circuit output of $6\ x_1^3\ x_2^2$ for any value of input variables $x_1$ and $x_2$.

This will be explained with reference to Table I below.

Initially counter/latch 20 is loaded with the value $g_1=3$. Because the $g_i$ count is not equal to 0, the value $x_1$ will pass to the multiplier 22 (in accordance with the gating function described above regarding FIG. 8) to be multiplied with W on line 24 through MUX 26.

Then counter/latch 20 begins counting down, and, so long as the $g_i$ count is not equal to 0, $x_1$ will continually be multiplied by the product of the multiplier 22. When the $g_i$ count reaches 0, then multiplier 22 will cease multiplication (or will simply continue multiplying the product by 1, depending upon the implementation of a neural network incorporating the neuron circuit) and wait for the next input $x_2$. At this point the intermediate output of the neuron circuit is $6\ x_1^3$.

When INPUT CLOCK=2, and $x_2$ is latched into latch 18, and $g_2=2$ is loaded into counter/latch 20, the operation continues essentially as described above until counter/latch 20 counts down to 0. At this point the final output of the neuron circuit is $6\ x_1^3\ x_2^2$.

The detailed operation is described by Table I below.

TABLE I

| INPUT CLOCK SEQUENCE | CLK SEQUENCE | COUNTER/LATCH | OUTPUT |
| --- | --- | --- | --- |
| 1 | 1 | 3 | $6\ x_1$ |
| 1 | 2 | 2 | $6\ x_1^2$ |
| 1 | 3 | 1 | $6\ x_1^3$ |
| 1 | 4 | 0 | $6\ x_1^3$ |
| 2 | 5 | 2 | $6\ x_1^3\ x_2$ |

TABLE I-continued

| INPUT CLOCK SEQUENCE | CLK SEQUENCE | COUNTER/LATCH | OUTPUT |
|---|---|---|---|
| 2 | 6 | 1 | $6 x_1^3 x_2^2$ |
| 2 | 7 | 0 | $6 x_1^3 x_2^2$ |
| 2 | 8 | — | $6 x_1^3 x_2^2$ |

While in this example the weight of the neuron circuit was multiplied at the beginning of the computational cycle, it will be understood that it may be multiplied at any appropriate time.

SUMMARY

Thus there has been described herein a concept, as well as several embodiments including a preferred embodiment, of an artificial neuron, and a method of producing an artificial neuron output, which require only a multiplier as their primary processing element.

Therefore, more neurons can be integrated in a VLSI chip or in a computer program, thereby greatly increasing the computational power of a neural network employing a plurality of such neurons.

This results in a neural network product having significant commercial advantages over those of the prior art in terms of processing power and speed, cost of manufacture, versatility of application, and market acceptance.

In the above-identified Related Invention there are disclosed various embodiments of neural networks which use the herein-disclosed artificial neuron as a basic building block. This is because of the unique functions of such artificial neuron, namely the ability to multiply together a plurality of gated inputs and to multiply the resulting product by a weight value. Because of these properties, the various embodiments of neural networks which are disclosed in the above-identified Related Invention may use the herein-disclosed artificial neuron to great advantage in implementing the polynomial expansions or orthogonal functions which form the basis of operation of such neural networks.

Therefore, there has been described herein an artificial neuron that can form the basis of a neural network which does not require lengthy training cycles and which converges on a global solution in a single training cycle.

Furthermore, it will be apparent to those skilled in the art that the disclosed invention may be modified in numerous ways and may assume many embodiments other than the preferred form specifically set out and described above.

For example, the neuron circuit of the present invention could be implemented in analog technology or by a combination of analog and digital technologies.

Moreover, implementations may be made in which the plurality of inputs $x_i$ may be processed in parallel rather than sequentially by appropriate circuitry.

In addition, the output latch may be replaced by a multiplexer.

Accordingly, it is intended by the appended claims to cover all modifications of the invention which fall within the true spirit and scope of the invention.

What is claimed is:

1. A neuron circuit comprising:
    a multiplier circuit in communication with a plurality of gated input signals, each of said gated input signals representing one of a plurality of inputs to said neuron circuit raised to an exponential power of one of a plurality of gating functions $g_i$, said multiplier circuit for multiplying said gated input signals together to produce a product and for multiplying said product by a predetermined weight to generate without a threshold comparison a neuron output signal;
    wherein at least one of said plurality of gating functions $g_i$ is greater than 1.

2. The neuron circuit recited in claim 1 and further comprising:
    means for generating said gated input signals by performing said one of said plurality of gating functions $g_i$ sequentially on each of said plurality of inputs to said neuron circuit, whereby said gated input signals are generated as follows:
    (a) if said one of said plurality of gating functions is 0, pass a gated input signal representative of 1 to said multiplier circuit;
    (b) if said one of said plurality of gating functions is 1, pass a gated input signal representative of said input to said multiplier circuit; and
    (c) if said one of said plurality of gating functions is greater than 1, pass a gated input signal representative of said input raised to a $g_i$ power to said multiplier circuit.

3. An integrated circuit comprising:
    at least one neuron circuit comprising:
        a multiplier circuit in communication with a plurality of gated input signals, each of said gated input signals representing one of plurality of inputs to said neuron circuit raised to a power of gating function $g_i$, wherein $g_i$ is greater than 1, said multiplier circuit for multiplying said gated input signals together to produce a product and for multiplying said product by a predetermined weight to generate without a threshold comparison a neuron output signal.

4. The integrated circuit recited in claim 3 in which said neuron circuit further comprises:
    means for generating said gated input signals by performing said gating function $g_i$ sequentially on each of said plurality of inputs to said neuron circuit, whereby said gated input signals are generated as follows:
    (a) if said gating function is 0, pass a gated input signal representative of 1 to said multiplier circuit;
    (b) if said gating function is 1, pass a gated input signal representative of said input to said multiplier circuit; and
    (c) if said gating function is greater than 1, pass a gated input signal representative of said input raised to a $g_i$ power to said multiplier circuit.

5. In neuron circuit having a plurality of inputs $x_i$, wherein i is a positive integer, a method of producing a neuron output signal comprising the following steps:
    (a) receiving a first input signal from a first of said plurality of inputs;
    (b) applying a first gating function to said first input signal by raising said first input signal to a power of $g_i$ to produce a first gated input;
    (c) multiplying said first gated input by a predetermined weight to produce a product;
    (d) determining whether all of said plurality of inputs have been received;
        (i) if so, generating without a threshold comparison said neuron output signal based on the product;
        (ii) if not, proceeding to step (e);

(e) receiving another input signal from another said plurality of inputs;

(f) applying another gating function to said another input signal to produce another gated input;

(g) multiplying said another gated input by said product to produce a further product; and (h) returning to step (d) until all of said plurality of inputs have been received;

wherein at least one of said gating functions raises a corresponding input signal to a power greater than 1.

6. The neuron circuit recited in claim 5, wherein in steps (b) and (f) said corresponding gated inputs are produced as follows:

(i) if said gating function $g_i$ is 0, then the value of said gated input $x_i$ is 1;

(ii) if said gating function $g_i$ is 1, then the value of said gated input $x_i$ is $x_i$; and (iii) if said gating function $g_i$ is greater than 1, then the value of said gated input $x_i$ is $x_i$ raised to a $g_i$ power.

7. In a neuron circuit having a plurality of inputs $x_i$, wherein i is a positive integer, a method of producing a neuron output signal, the method comprising the following steps:

(a) applying a gating function $g_i$ to a corresponding input signal on each of said inputs $x_i$ to produce a corresponding plurality of gated inputs by raising each of said inputs $x_i$ to a power of $g_i$;

(b) multiplying said gated inputs together to produce a product; and (c) generating without a threshold comparison said neuron output signal by multiplying said product by a predetermined weight;

wherein at least one of said gating functions raises a corresponding input signal to a power greater than 1.

8. The neuron recited in claim 7, wherein in step (a) said corresponding plurality of gated inputs are produced as follows:

(i) if said gating function $g_i$ is 0, then the value of said gated input $x_i$ is 1;

(ii) if said gating function $g_i$ is 1, then the value of said gated input $x_i$ is $x_i$; and (iii) if said gating function $g_i$ is greater than 1, then the value of said gated input $x_i$ is $x_i$ raised to a $g_i$ power.

* * * * *